April 18, 1933. F. V. JOHNSON ET AL 1,904,239
MOLDING MACHINE
Filed Dec. 10, 1928  6 Sheets-Sheet 1

Inventors
Fred V. Johnson
Estyle D. Hanson
Daniel V. Waters
By N. A. Patten Att'y April 18, 1933.  F. V. JOHNSON ET AL  1,904,239
MOLDING MACHINE
Filed Dec. 10, 1928  6 Sheets-Sheet 2

Inventor
Fred V. Johnson
Estyle D. Hanson
Daniel V. Waters
By N. A. Pattison Att'y.

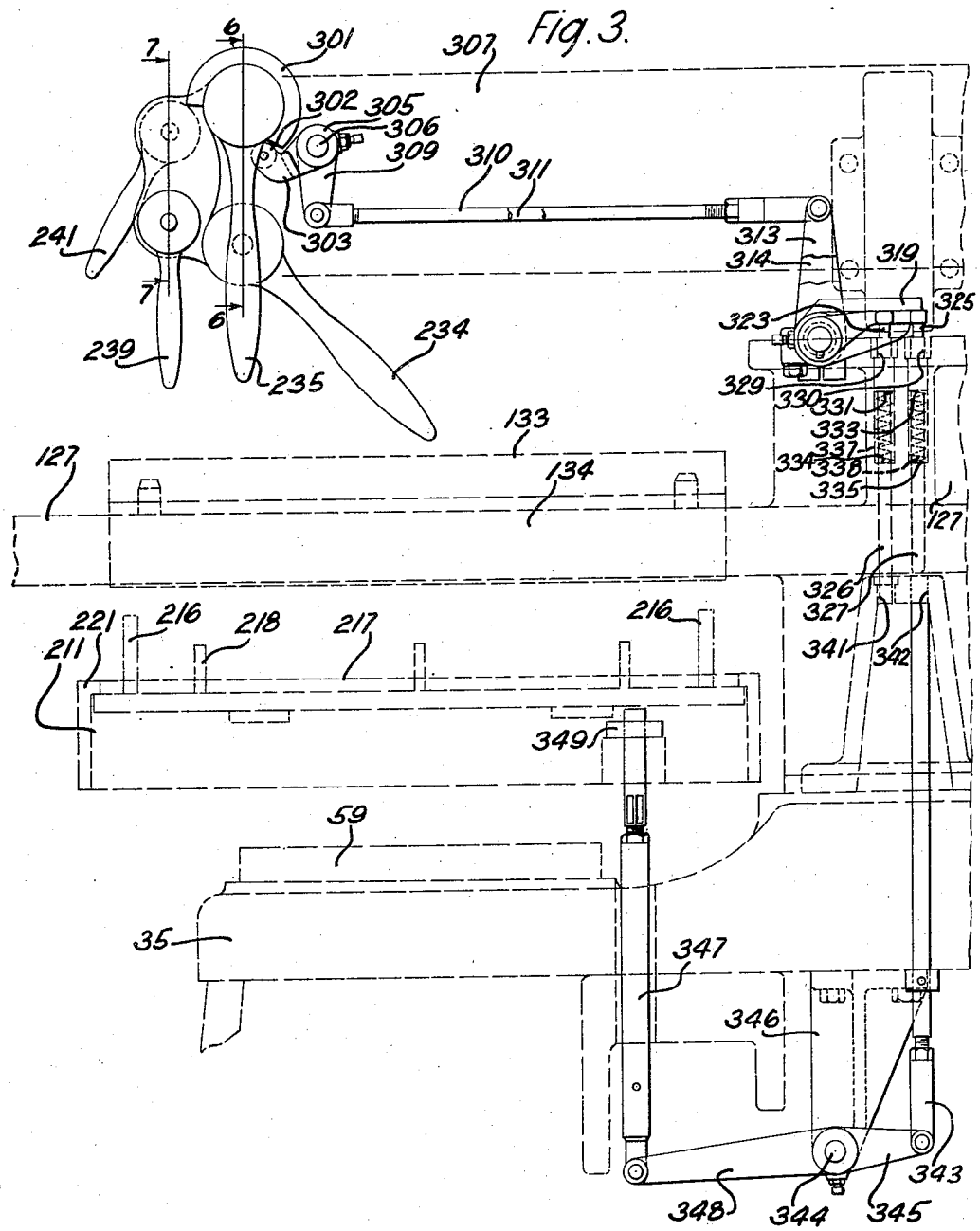

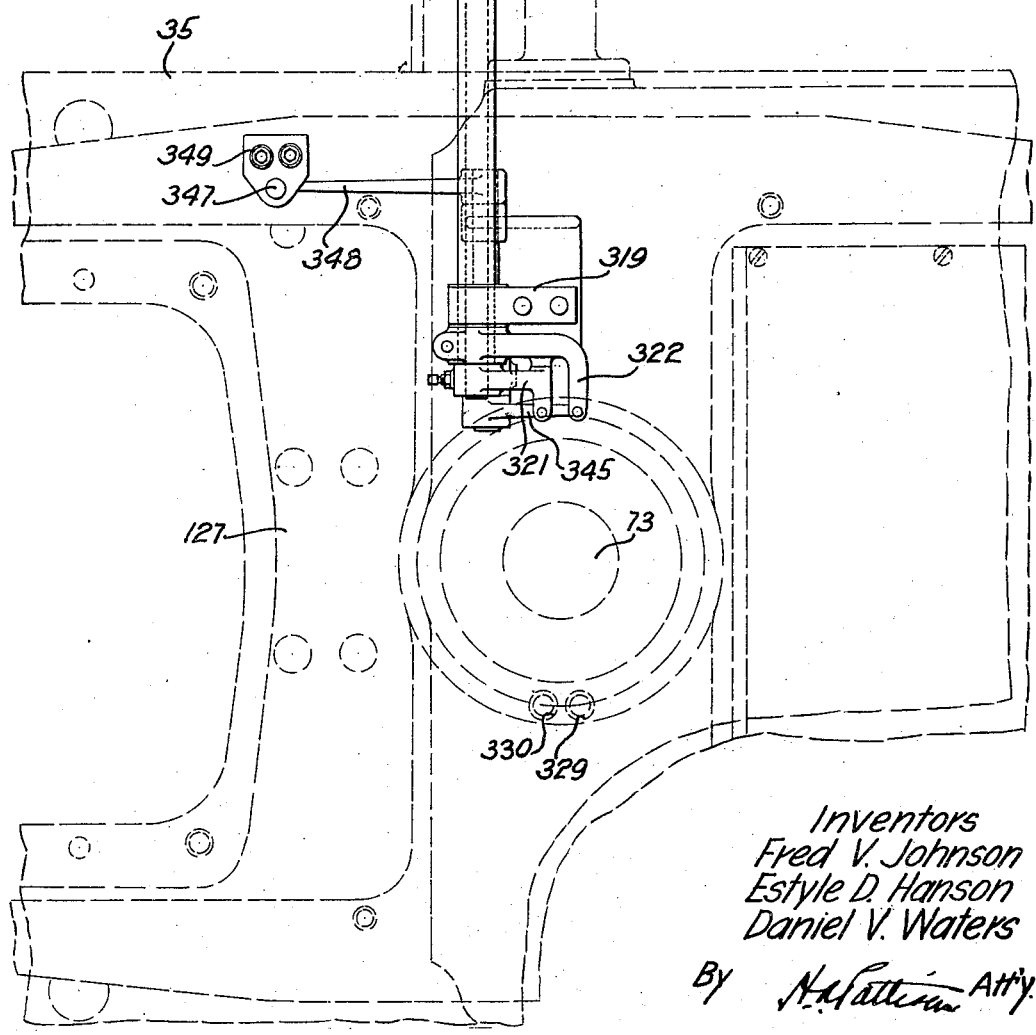

April 18, 1933.  F. V. JOHNSON ET AL  1,904,239
MOLDING MACHINE
Filed Dec. 10, 1928   6 Sheets-Sheet 5
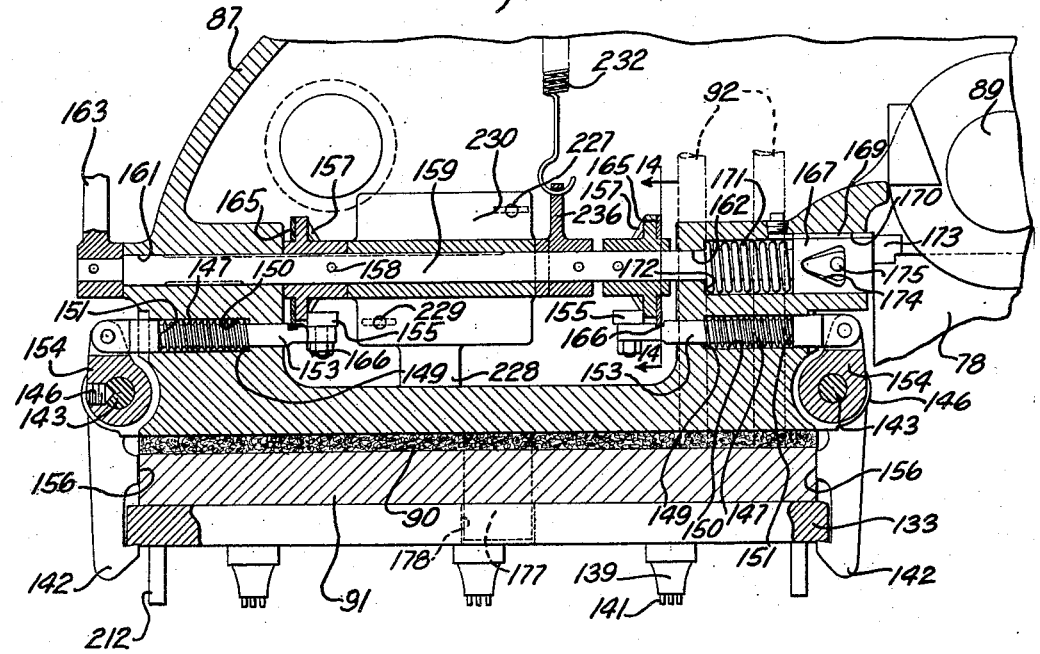
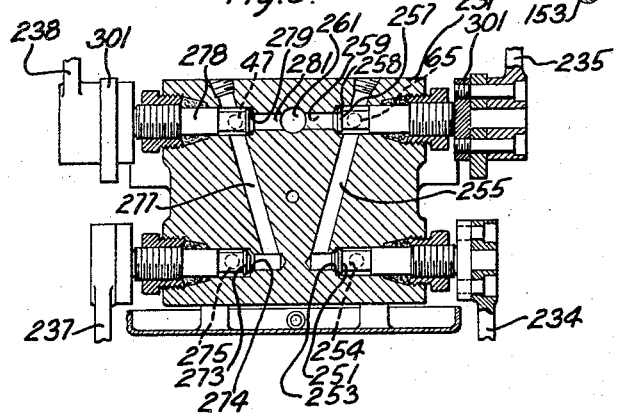
Inventors
Fred V. Johnson
Estyle D. Hanson
Daniel V. Waters
By  Att'y.

April 18, 1933.  F. V. JOHNSON ET AL  1,904,239
MOLDING MACHINE
Filed Dec. 10, 1928   6 Sheets-Sheet 6
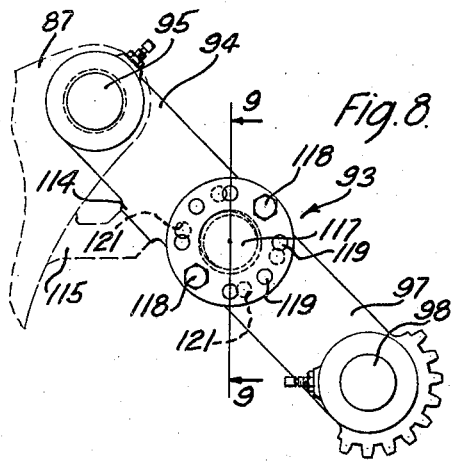
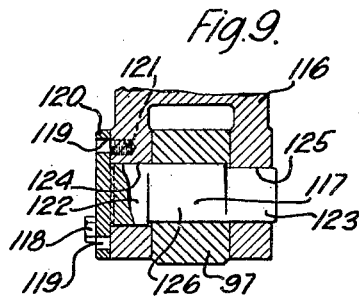
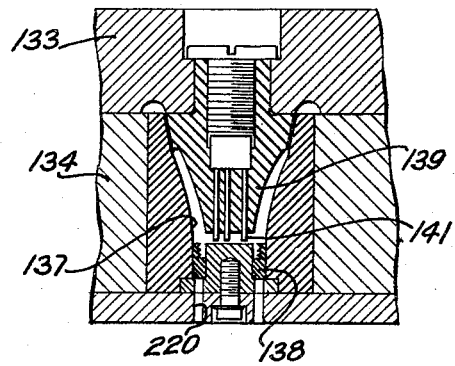
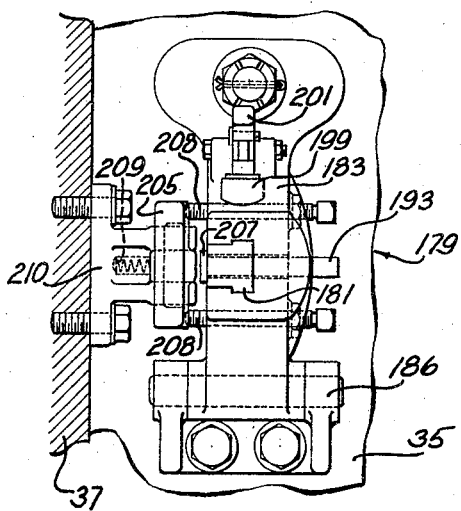
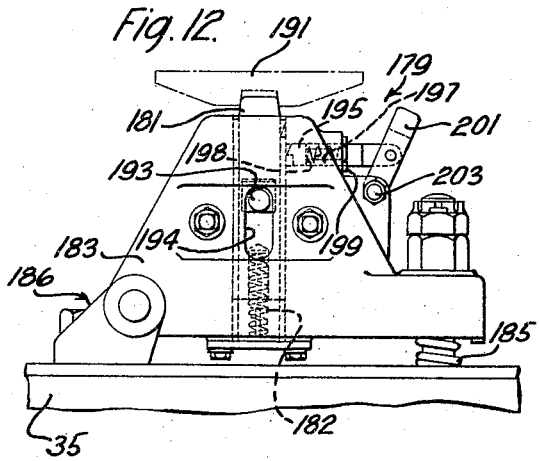
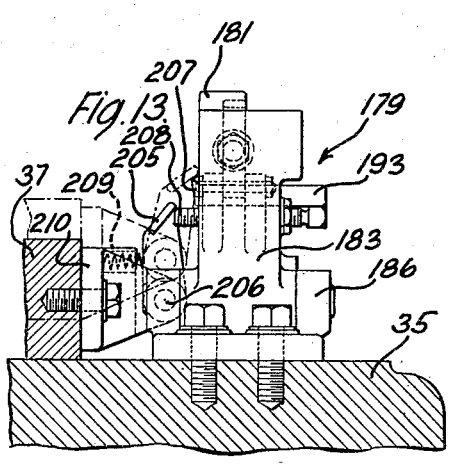
Inventors
Fred V. Johnson
Estyle D. Hanson
Daniel V. Waters
By ———— Atty.

Patented Apr. 18, 1933

1,904,239

UNITED STATES PATENT OFFICE

FRED VOLENTINE JOHNSON, OF IRVINGTON, NEW JERSEY, ESTYLE DRUCY HANSON, OF WESTMONT, ILLINOIS, AND DANIEL VAUGHN WATERS, OF OAK PARK, ILLINOIS, ASSIGNORS TO WESTERN ELECTRIC COMPANY, INCORPORATED, OF NEW YORK, N. Y., A CORPORATION OF NEW YORK

MOLDING MACHINE

Application filed December 10, 1928. Serial No. 324,812.

This invention relates to molding machines and more particularly to a molding press operated hydraulically for forming articles from plastic material.

An object of the invention is the provision of an efficient, expeditious, and easily operable machine for molding articles from plastic material.

In accordance with one embodiment, the invention contemplates a two station molding press provided with a rotatable table which supports two oppositely disposed two section molds and which, when rotated, advances the molds from one station to the other. At one of these stations which may be referred to as the main pressing station, heated platens are located, one of which is fixed while the other is reciprocated vertically by a hydraulically operated ram positioned in the base of the press. When the ram is elevated, the mold which had been moved into alignment therewith through the rotation of the table, is moved free of the table into engagement with the upper platen, and the moldable material in the mold is consequently subjected to heat and pressure. However, the ram cannot be operated unless the table is positioned to align accurately the mold and the ram. The other station or the subpressing station is constructed quite differently. It also has a hydraulically operated ram, but the platens are cooled by circulating water and the upper platen is secured to a tiltable head which is adapted to be moved into and out of parallelism with respect to the lower platen by hydraulically actuated mechanism and is capable of being adjusted to compensate for any slight displacement of parallelism. After the molds have been cooled, the upper section thereof is locked to the tilting head, and the mold sections are separated upon the actuation of the sub-station ram, and the molded parts are ejected through the cooperation of an ejector plate which must be in a predetermined position with respect to its associated ram before the ejection of the molded parts can be effected. Mechanism is also provided for insuring the proper sequence of the operation of the controls to avoid any possible injury to the equipment or the operator.

Other objects and advantages of this invention will become apparent from the following detailed description, reference being had to the accompanying drawings, wherein Fig. 1 is a front elevational view of a two station hydraulically operated molding press embodying the features of the invention;

Fig. 3 is a fragmentary sectional view taken on the line 3—3 of Fig. 1, in the direction indicated by the arrows, having the structure with the exception of the locking means shown dotted;

Fig. 4 is a sectional view taken on the line 4—4 of Fig. 1, in the direction indicated by the arrows, and also discloses certain features of the interlocking mechanism, the other parts being shown in dotted lines;

Fig. 5 is a fragmentary sectional view taken on the line 5—5 of Fig. 1, in the direction indicated by the arrows;

Fig. 6 is a fragmentary sectional view taken on the line 6—6 of Fig. 3, showing the structure of the control valves;

Fig. 7 is a sectional view taken on the line 7—7 of Fig. 3, in the direction indicated by the arrows;

Fig. 8 is an enlarged fragmentary elevational view of the toggle connection for tilting the head of the press;

Fig. 9 is a fragmentary sectional view taken on the line 9—9 of Fig. 8, in the direction indicated by the arrows;

Fig. 10 is a fragmentary sectional view taken on the line 10—10 of Fig. 2, in the direction indicated by the arrows;

Figs. 11, 12 and 13 are top, rear and side views, respectively, of the detent lock for positioning the turn-table and its cooperating parts;

Fig. 14 is a fragmentary sectional view taken on the line 14—14 of Fig. 5, in the direction indicated by the arrows.

Figure 1:
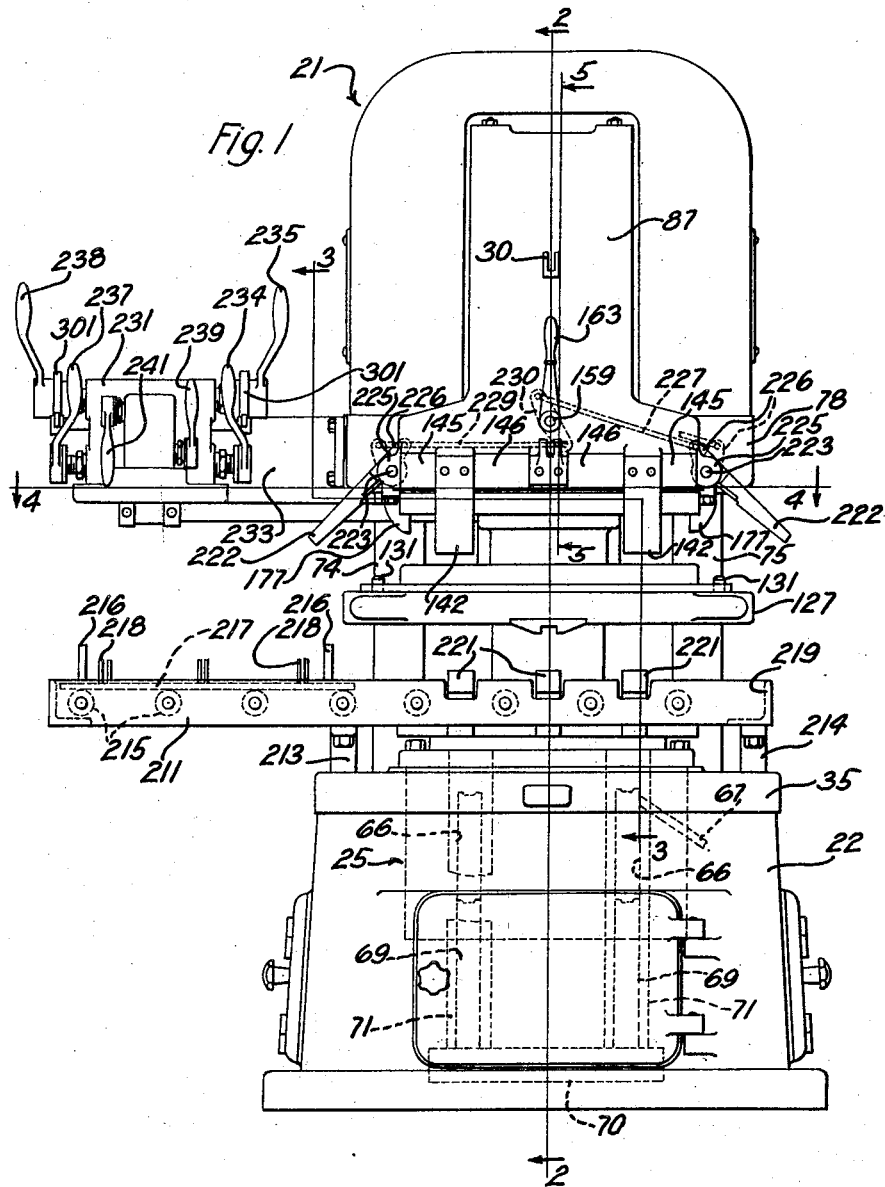

Referring now to the drawings wherein like reference numerals designate the same parts throughout the various views, the numeral 21 designates generally a two-station hydraulic molding press, which includes a base 22 which houses the main press operating mechanism and the sub-press operating mechanism, designated generally by the numerals 23 and 25, respectively. The main press operating mechanism 23 is suspended from a supporting plate 35 which is cast in one piece of varying thicknesses being thickest adjacent the main press operating mechanism where it will be subjected to greatest strain. The supporting plate is mounted on the base 22 and the main press operating mechanism supported thereby actuates a head 37 on which is mounted an intermediate plate 38, a heat insulating pad 39 and a steam heated platen 41 to which steam is supplied by a flexible hose 42 connected to a source of supply not shown.

Vertical movement of the head 37 is controlled by two oppositely disposed pistons 43 and 45, the piston 43 moves the head 37 and the parts supported thereby upwardly upon the admission of water to a cylinder 46 with which the piston 43 cooperates. The water is admitted to the cylinder 46 through an inlet and outlet pipe 47 connected under pressure to a source of supply not shown. The piston 45 which is connected to the head 37 by an equalizing cross member 49 having guide posts 50 and 51 attached to either end thereof and to the head 37, causes the movement of the head 37 downwardly upon the admission of water or other fluid under pressure to a cylinder 53 with which the piston 45 cooperates. The water is admitted to the cylinder 53 through an inlet and outlet pipe 54 connected to a source of supply under a pressure substantially less than that of the supply which is admitted to the cylinder 46 and will move the piston 45 downwardly only after the water in the cylinder 46 has been permitted to escape through the inlet and outlet pipe 47.

The sub-press operating mechanism 25, which is of a construction somewhat similar to that of the main press operating mechanism 23, is also supported by the supporting plate 35, and actuates a head 57 upon which are mounted a heat insulating pad 58 and a cooling platen 59 to which water or other fluid cooling medium is admitted through a flexible hose connection 61. Upward movement of the head 57 is caused by a piston 62 on which the head 57 is mounted cooperating with a cylinder 63 upon the admission of water under pressure thereto through an inlet and outlet pipe 65. The downward movement of the head 57 may be caused by the admission of water under pressure to cylinders 66—66 through pipes 67—67 which will drive a pair of pistons 69—69 cooperating with the cylinders 66—66 downwardly, provided the water in the cylinder 63 is exhausted therefrom through the inlet and outlet pipe 65, the ends of the pistons 69—69 being fixed to an equalizing plate 70 which is secured to the head 57 by guide posts 71—71.

Three upright members 73, 74 and 75 are secured to the supporting plate 35 by means of nuts 77—77 and support a head 78 to which they are also secured by means of nuts 77—77. Fixed to the lower surface of the head 78 is a stationary press head 82 on which are mounted a heat insulating pad 83 and a steam heated platen 85 to which steam is admitted through a pipe 86 and which is in vertical alignment with the steam heated platen 41 mounted on the vertically movable press head 37.

Figures 2, 15:
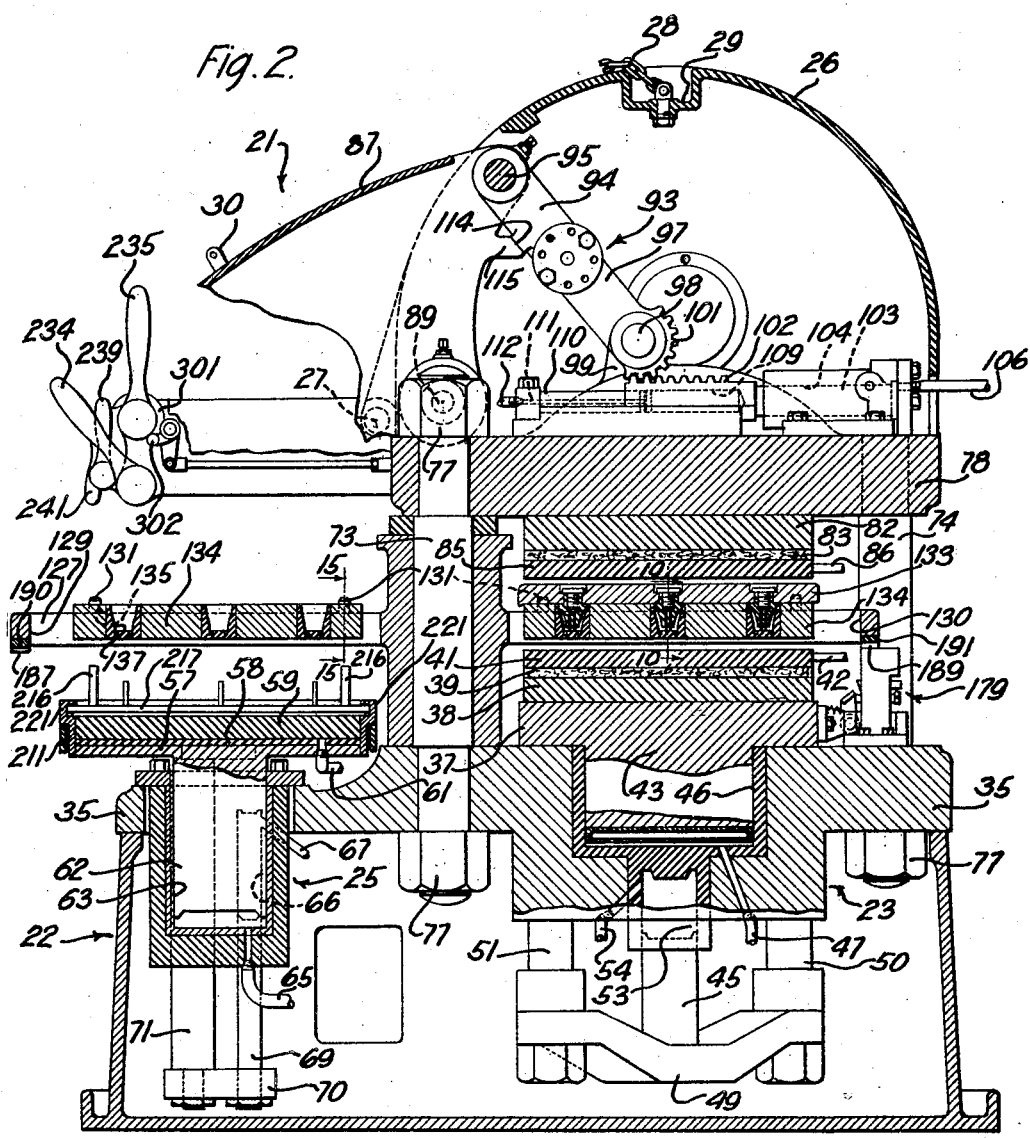
Fig. 2 is a fragmentary sectional view taken on the line 2—2 of Fig. 1, in the direction indicated by the arrows.
Fig. 15 is a fragmentary sectional view taken on the line 15—15 of Fig. 2, in the direction indicated by the arrows, showing the mold sections on the table.

A tiltable head 87 is pivoted to the head 78 at 89 and has secured on its under surface a heat insulating pad 90 (Fig. 5) and a cooling platen 91 to which a cooling fluid is admitted by pipes 92—92 and may be tilted about the pivot point 89 by means of a toggle connection, designated generally by the numeral 93. The toggle connection 93 is composed of an upper toggle lever 94 which is pivoted about a pin 95 secured to the head 87, and a lower toggle lever 97 which is pivoted about a pin 98 mounted in supporting members 99—99 secured to the upper surface of the head 78. The lower toggle lever 97 has a segmental gear 101 formed integral with the lower end thereof, the teeth of which mesh with a reciprocable rack 102 which may be moved to the right or the left (Fig. 2) by means of a piston 103 cooperating with a cylinder 104 to which fluid under pressure may be admitted to and exhausted through a pipe 106.

The rack 102 has a cylindrical chamber 109 formed therein with which a piston 110 having a chamber 111 therethrough co-operates. The cylinder 104 controls the movement of the rack 102 to the left whereas the piston 110 cooperating with the chamber 109 controls the movement of the rack 102 to the right upon the escape of the fluid from the cylinder 104 through pipe 106, the chamber 111 being connected through a pipe 112 to a source of fluid under a pressure less than that furnished to the pipe 106.

The upper toggle lever 94 (Figs. 8 and 9) has a flat portion 114 formed thereon which cooperates with a projection 115 formed on the head 87 to rigidly support the head 87, and has a bifurcated portion 116 also formed thereon into which the end of the toggle lever 97 enters. The lever 97 is pivoted about a pivot pin 117 secured to one of the arms of the bifurcated portion 116 by two bolts 118—118 passed through two oppositely disposed holes 119—119, of which there are eight, formed in a shoulder 120 on the pivot pin 117 and engaged in two oppositely disposed threaded apertures 121—121, of which there are six, formed on the arm of the bifurcated portion 116. The pivot pin 117 has concentric portions 122 and 123 for engaging apertures 124 and 125, respectively, in the arms of the bifurcated portion 116 and an eccentric portion 126 about which the toggle lever 97 is pivoted. This eccentric pivot 117 in the toggle connection 93 permits a very fine adjustment of the head 87 for parallelism with the head 57. A tiltable housing 26 is pivoted to the head 78 at 27 and encloses the toggle connection and its cooperating parts. The housing may be tilted about its pivot to permit the adjustment of the toggle connection by tilting the head 87 out of parallelism with the head 57 and attaching a chain 28 secured to the housing and normally positioned in a depression 29 in the housing, to an eye 30 on the tilting head and returning the tilting head to its former position.

A table 127 having apertures 129 and 130 formed therein is rotatable about the upright member 73 and may carry upper and lower molding members 133 and 134 positioned thereon by pins 131—131 which project from the upper surface of the table 127 and engage apertures 135—135 formed in the lower molding member 134. The molding members 133 and 134 which in this specific example, are designed for forming telephone mouthpieces have cooperating parts between which the mouthpieces may be formed. The lower molding member 134 (Fig. 10) has a plurality of irregular shaped recesses 137—137 formed therein in which forming members 138—138 are positioned. The upper molding member 133 has projecting members 139—139 from which extend a plurality of pins 141—141 about which the material placed in the recesses 137—137 in the molding member 134 will be molded.

The upper molding member 133 may be secured to the cooling platen 91 of the tilting head 87 by latches 142—142 fixed to shafts 143—143 journalled in bearings 145—145 and 146—146 formed integral with the base of the head 87. The latches 142—142 are normally urged toward the center of the cooling platen 91 by compression springs 147—147 which are seated between shoulders 149—149 formed in apertures 150—150 in the head 87 and shoulders 151—151 on longitudinally reciprocable levers 153—153 pivoted to the upper end of levers 154—154 secured to the shafts 143—143. The movement of the latches 142—142 toward the center of the platen 91 beyond a predetermined position is prevented by the engagement of the platen 91 by projecting portions 156—156 formed on the latches 142—142.

The longitudinally reciprocable levers 153—153 have cam rollers 155—155 mounted on the end thereof opposite the end at which the latches 142—142 are pivoted, which cam rollers 155—155 cooperate with cams 157—157 fixed by pins 158—158 to a shaft 159 journalled in the head 87 at 161 and 162. Thus the rotation of the shaft 159 by moving a manually controlled lever 163 to the left (Fig. 1) which is fixed to the shaft 159, will cause the levers 153—153 to be drawn inwardly against the action of the springs 147—147 releasing the latches 142—142. The accidental release of the latches 142—142 independent of the manual lever 163, at all times except when the cams 157—157 are operatively engaging the cam rollers 155—155, is prevented by metal disks 165—165 mounted on the rear of the cams 157—157 and fitting into slots 166—166 cut in the levers 153—153.

The release of the latches 142—142, when the head 87 is tilted, is prevented by a bushing 167 mounted on and slidable longitudinally of the shaft 159. This bushing 167 has a key 169 formed thereon which slides in a key way 170 cut in the head 87 and is urged to the right (Fig. 5) by a heavy compression spring 171 positioned between it and a shoulder 172 in the head 87, into engagement with a plate 173 attached to the stationary head 78. A V-shaped slot 174 is cut in the slidable bushing 167 in which a pin 175 fixed to the shaft 159 rides.

When the tiltable head 87 is in the position shown in Fig. 5, the shaft 159 is free to rotate through approximately 90°, but when the head 87 is tilted out of parallelism with the head 57 the base of the lower right hand edge of the head 87 (Fig. 5) will be moved away from the head 78 and the spring 171 will be permitted to move the bushing 167 to the right moving the apex of the V-shaped slot 174 into engagement with pin 175 and thereby preventing the rotation of the shaft 159. In order that the entire weight of the upper molding member 133 will not rest on the right hand (Fig. 5) latches 142 when the head 87 is tilted, and in order to accurately align the upper molding member 133 with the lower molding member 134, guides 177—177 are fixed to the under surface of the head 87 and engage slots 178—178 cut in the upper molding member 133 and support the upper molding member when the head is tilted.

The table 127 which carries the molding members 133 and 134 between the main and sub-pressing stations has a stop, designated generally by the numeral 179, which accurately positions it in either of its operating positions. This stop 179 (see Figs. 11, 12 and 13) comprises a detent lock 181 which is urged upwardly by a compression spring 182 mounted in a block 183 resiliently mounted to the supporting plate 35 by a spring 185 and a pivot connection at 186. The detent lock 181 is adapted to engage slots 187 and 189 formed in the projecting portions 190 and 191, respectively, on the under surface of the table 127. The upward movement of the detent lock 181 due to the compression spring 182, beyond a predetermined point, is prevented by a pin 193 fixed in the detent lock 181 and extending into and slidable in a slot 194 cut in the side of the block 183.

The detent lock 181 has cooperating therewith a detent 195 which is urged toward the detent lock 181 by a compression spring 197 positioned between a shoulder 198 formed on the detent 195 and a bushing 199 threaded into the block 183. The detent 195 has pivoted at the end thereof a lever 201 which is in turn pivoted to the block 183 at 203 and the end of which, opposite to the pivot point 203, may be engaged by the projections 190 and 191 formed on the table 127 (Figs. 2 and 12) for effecting the release of detent 195. The detent lock 181 and its cooperating detent 195 are reset automatically by the lowering of the head 37 which has a lever 205 (Figs. 11 and 13) pivoted thereto at 206, and which is normally urged into engagement with a projecting shoulder 207 formed on the detent lock 181 by a compression spring 209 positioned between a base 210 secured to the movable head 37 and the lever 205. After the detent 195 has engaged the detent lock 181 the lever 205 will be moved out of engagement with the projecting shoulder 207 on the detent lock 181 due to a camming action between said lever 205 and the projecting ends of two screws 208—208 which extend through the block 183.

A guide way 211 mounted transversely of the front of the press 21 and mounted on the supporting plate 35 by upright members 213 and 214 carries a plurality of rollers 215 upon which an ejector plate 217 is slidably mounted. The ejector plate 217 may be moved transversely of the machine on the rollers 215—215 to carry ejecting pins 218—218 mounted thereon into and out of operative association with the lower molding member 134.

When it is desired to utilize the ejector plate for removing completed articles from the lower molding member 134, the plate may be slid to the right (Fig. 1) until it strikes the end 219 of the framework 211, provided the sub-press head 57 is in its lowest position. The ejector plate 217 which also carries mold displacing pins 216—216 will then pass between the upper and lower surfaces of a plurality of retaining members 221—221 attached to the sub-press head and be raised by the operation of the sub-press head until the mold displacing pins 216—216 engage positioning members 212—212 which are secured to the upper molding member and engage apertures 224—224 in the lower molding member. Continued upward movement of the press head will raise the upper molding member out of engagement with the lower molding member and into engagement with the latches 142—142 of the tilting head 87 and the ejecting pins 218—218 will pass through apertures 220—220 in the lower molding member (see Fig. 10) and engage the under surface of the forming member 138 to eject the molded articles from the recesses 137—137, thus simultaneously securing the upper molding member for displacement away from the lower molding member and ejecting the molded articles.

Mechanism is provided for holding the lower molding member 134 down while the upper molding member 133 is being moved upwardly by the mold displacing pins 216—216 cooperating with the positioning members 212—212. This mechanism comprises a pair of stopping blocks 222—222 mounted at each side of the tilting head 87 and secured to shafts 223—223 rotatably journalled in bearings 225—225 which shafts 223—223 have levers 226—226 attached thereto. The stopping blocks 222—222 may be moved into association with the lower molding member 134 by moving the lever 163 to the right since the levers 226—226 have links 227 and 229 connecting them to the opposite ends of a lever 230 mounted on the shaft 159.

The lever 163 is normally retained in an upright position to hold the stopping blocks 222—222 away from the platen 91 and to hold the latches 142—142 against the platen 91 by a counter weight 228 (Fig. 5) mounted on the shaft 159 and a spring 232 attached to a sleeve 236 mounted on the shaft 159 and attached to the top of the head 87.

The operation of the main press operating mechanism 23, the sub-press operating mechanism 25, and the tilting head cylinder 104 is controlled by a plurality of manually operable valve controls mounted on a valve block 231 which is supported on the main press head 78 by a framework 233 which extends from the left side thereof (Fig. 1). Manually operable levers 234, 235, 237, 238, 239 and 241 control a sub-press inlet valve, a sub-press outlet valve, a main press inlet valve, a main press outlet valve, a tilting head cylinder inlet valve, and a tilting head cylinder outlet valve, respectively. The lever 234 controls a screw type valve 251 which, when moved to the right (Fig. 6), opens a port 253 in which the valve 251 seats, thereby allowing a flow of water from a pipe 254 connected to a source of supply under pressure (not shown). The water will thus flow through the port 251, a chamber 255 and into the pipe 65 connected to the sub-press cylinder 63 to actuate the piston 62 upwardly. The lever 234 when moved to the left closes the port 253 and shuts off the flow of water under pressure to the cylinder 63. Lever 235 controls a screw type valve 257 which, when moved to the right (Fig. 6), opens a port 258 in which the valve 257 is seated. This will permit water to flow in the chamber 255 and cylinder 63 through the pipe 65, through the port 258 and a chamber 259 associated therewith to an exhaust pipe 261.

The lever 239 has a screw type valve 262 associated therewith which is seated in a port 263 and which, upon its movement to the right (Fig. 7), will open the port 263 and permit fluid under pressure to enter from a pipe 265 through the port 263 into a chamber 266 with which the pipe 106, associated with cylinder 104, is connected. The piston 103 to which the rack 102 is fixed will thus be moved to the left to tilt the head 87. The lever 241, which has a screw type valve 269 attached thereto, controls the opening and closing of a port 270 in which the valve 269 seats. Upon the movement of the valve 269 to the left (Fig. 7) by the lever 241 the port 270 will be opened and will permit fluid under pressure in cylinder 104 to be forced out through the pipe 106, the port 270 and an exhaust pipe 271.

The lever 237 has a screw type valve 273 attached thereto which seats in a port 274 to which in turn a pipe 275 connected to a source of water under pressure (not shown) is connected. Upon the movement of the valve 273 to the left, due to the operation of the lever 237 the water will pass from the pipe 275 through the port 274, a chamber 277 to the pipe 47 and thence to the cylinder 46 to move the piston 43 upwardly. The lever 238 has a valve 278 associated therewith which seats in a port 279, this valve 278 may be unseated to permit water in the cylinder 46 to be forced out through the pipe 47, open port 279, a chamber 281, and the exhaust pipe 261 connected to said chamber 281.

The outlet valve control levers 238 and 235 for the main press cylinder and the sub-press cylinder, respectively, have interlocking mechanism associated therewith and controlled thereby which prevents the operation of the heads associated with the two press operating mechanisms 23 and 25, except when the table 127 has been locked in either of its operating positions by the stop 179. The interlocking device which permits the main press head 37 and the sub-press head 57 to apply pressure only when the table 127 is in either of its operating positions and thereby prevents damage to the table comprises a pair of cams 301—301 mounted on the levers 235 and 238 and a pair of cam rollers 302—302 (Fig. 3) cooperating with the cams 301—301. The cam rollers 302—302 are secured to the ends of bell crank levers 303—303 extending from sleeves 305—305 which are pivoted about a pin 306 mounted on a portion 307 of the framework 233 and which have arms 309—309 extending therefrom.

The arms 309—309 associated with the levers 235 and 238 are connected by adjustable links 310 and 311 to bell crank levers 313 and 314 (Fig. 4), respectively, which are in turn secured to a shaft 315 and a sleeve 317 journalled in members 318 and 319, respectively. A bracket 320 mounted on the supporting plate 35 supports the member 318 and the supporting plate 35 has the member 319 mounted thereon. The movement of the bell cranks 303—303 will cause either the shaft 315 or sleeve 317 to rotate, dependent on which of the levers 235 or 238 has been actuated. The shaft 315 has an arm 321 secured thereto and the sleeve 317 has a similar arm 322 secured thereto.

The arms 321 and 322 have depending portions 323 and 325, respectively, which, provided the table 127 is in either of its operating positions, cooperate with slidable shafts 326 and 327, respectively, positioned in apertures 329 and 330 in the table 127. The shafts 326 and 327 have collars 331 and 333 formed thereon between which collars and shoulders 334 and 335 compression springs 337 and 338, respectively, are positioned. The springs 337 and 338 normally urge the shafts 326 and 327, respectively, in an upward direction so as to free the depending portions 321 and 322 of the apertures 329—329 and 330—330 when the cam roller 302 strikes the dwell of the cam 301. When the exhaust valve 257 controlled by the handle 235 is closed the roller 302 will be moved in a counter-clockwise direction (Fig. 3) by the action of the cam 301, preventing the table 127 from being moved about its axis. Also, the valve 257 controlled by the lever 235 cannot be opened unless the table 127 is in either of its operating positions when the depending portions 323 and 325 can force the shafts 326 and 327 downwardly into apertures 341 and 342 in the upright member 73 about which the table 127 rotates.

The device which prevents the upward movement of the head 57 when the ejector plate 217 is in neither its extreme right hand or extreme left hand position consists of a link 343, (Fig. 3) a lever 345 attached to a shaft 344 pivoted in a bracket 346 secured to the under side of the supporting plate 35. The shaft 344 has a lever 348 secured thereto which carries at its other end a shaft 347 which passes through a guide plate 349 and into the path of the ejector plate 217 if the ejector plate is in either its extreme right or extreme left hand position (Fig. 1). The shaft 347 will be prevented from moving upwardly if the ejector plate is not in either of these positions since it will strike the under surface of the ejector plate and therefore the shaft 327 will not be permitted to move downwardly. This in turn will restrain the movement of the arm 322 and prevent the movement of the lever 235.

It is believed that a better understanding of this invention will be had by reference to the following description of the operation thereof. In the description of the operation, it has been assumed that the table 127 has positioned thereon in the apertures 129 and 130, the upper and lower molding members 133 and 134 and also that the tilting head has been adjusted by means of the eccentric pin 117 of the toggle connection 93 into parallelism with the vertically movable head 57 of the sub-pressing station 25.

The lever 234 may be moved to open the port 253 (Fig. 6) permitting a flow of water from the pipe 254 through the chamber 255 and the pipe 65 to the sub-press cylinder 63, thus actuating the piston 62 upwardly and raising the molding members 133 and 134 until the upper molding member 133 is clamped by the latches 142—142 against the platen 91. The lever 234 may then be moved to close the port 253 shutting off the flow of water to the cylinder 63, and the lever 235 may be moved to open the port 258 allowing the pressure in cylinders 66—66 which is constant to force the pistons 69—69 downwardly and force the water in cylinder 63 through the pipe 65, the open port 258, the chamber 259 and the exhaust pipe 261, thus moving the head 57 downwardly. In passing the table 127 the head 57 will deposit the lower molding member 134 thereon where the recesses 137 may be filled with a plastic composition in granulated form.

In order to facilitate the loading of the mold cavities formed by the recesses 137—137 and the forming member 138—138 in the lower molding member, the head carrying the upper molding member may be tilted out of parallelism with the lower molding member. This may be accomplished in the following manner: The lever 239 may be moved to open the port 263 and permit fluid under pressure to enter from the pipe 265 through the port 263 into the chamber 266 to which the pipe 106 is connected. This will move the piston 103 to the left (Fig. 2), which action will carry the rack 102 to the left and cause the segmental gear 101 associated therewith to rotate in a clockwise direction. This will in turn cause the toggle connection 93 to fold back upon itself and tilt the head 87 about its pivot point 89.

After the recesses 137 in the lower molding member have been filled with a plastic composition, the tilting head may be tilted back into parallelism with the lower molding member by moving the lever 239 to close the port 263 and then moving the lever 241 to open the port 270. This will permit the water in cylinder 104 to be forced out through the pipe 106, the port 270 and the exhaust pipe 271 due to the constant pressure exerted in the chamber 109 formed in the rack 102.

In order to position the upper molding member 133 and the lower molding member 134 with the plastic composition between them on the table 127 the lower molding member 134 may be raised by the head 57, as described hereinbefore, until it comes into contact with the upper molding member 133, whereupon the lever 163 may be moved to the left and through the cams 157 which it controls and the lever 153 which the cams 157 actuate, it will release the latches 142 and the head 57 may be lowered to its lowest position whereby in passing the table 127 the molding members 133 and 134 will be deposited thereon.

The table 127 may now be rotated manually about the upright member 73 until stopped by the stop mechanism 179. The molding members with the plastic composition therebetween may now be compressed and heated between the platens 41 and 85 by elevating the head 37 until the platen 41 carried thereby raises the molding members into engagement with the platen 85. The upward movement of the head 37 is caused by admitting water to the cylinder 46 by moving the lever 237 controlling the valve 273 and permitting water to flow from a pipe 275 connected to a source of supply under pressure (not shown) through the port 274, the chamber 277 and the pipe 47 to the cylinder. The operation as described in connection with loading the mold which is now under pressure may be repeated with a similar mold now at the sub-pressing station, while heat and pressure are being applied to the mold members at the main pressing station to mold the article.

The molding members 133 and 134 at the main pressing station 23 having been under pressure for a predetermined time, and the lower molding member at the sub-pressing station having been loaded, the molding members at the main pressing station 23 may be lowered onto the table 127 by lowering the head 37. This may be accomplished by closing the port 274 and opening the port 279 to allow the water in the cylinder 46 to be forced out of the pipe 47, the open port 279 and the chamber 281 to the exhaust pipe 261 by the pressure constantly exerted in the chamber 53.

The table may now be rotated to bring the freshly loaded mold into the main pressing station, and the molding members 133 and 134 containing the molded articles may be cooled while under pressure in the following manner at the sub-pressing station. The head 57 may be elevated in the manner described hereinbefore until the molding members are compressed between the cooling platens 59 and 91. After the articles have been cooled sufficiently the molding members may be again lowered to the table and the head 57 may be lowered to its lower-most position, whereupon the ejector plate 217 may be slid between the upper and lower surfaces of the retaining members 221—221 fixed to the head 57. The lever 163 may then be moved to bring the stopping blocks 222 into a vertical position, whereupon the head 57 carrying the ejector plate 217 may be raised until the pins 218 enter the apertures 220 in the lower molding member 134 and engage the forming member 138, forcing it up until the molded articles are forced out of recesses 137. The tilting head may then be tilted as described hereinbefore and while in that position the molded articles may be removed from the lower molding member. After the molded articles have been removed from the mold the ejector plate may be returned to the left end of the guideway (Fig. 1), the molds refilled and the operation repeated.

Although the invention has herein been described in connection with a two station plastic molding press for manufacturing telephone mouthpieces, it is to be understood that the invention is capable of many other applications and should be limited only by the scope of the appended claims.

What is claimed is:

1. A molding press comprising a hydraulically movable heating platen, a stationary head associated therewith, a hydraulically movable cooling platen, a tiltable head associated therewith, and a hydraulically operated adjustable toggle connection operable independently of the movable cooling platen for tilting the tiltable head.

2. A two station plastic molding press comprising pressing means at both stations, molding members for forming an article, means for ejecting the article from the molding members, and means for preventing the operation of the pressing means at one station unless the ejecting means is in a predetermined position.

3. A two station plastic molding press comprising pressing means at both stations, molding members for forming an article, a table for carrying the molding members between the stations, means for ejecting the article from the molding members, and means for preventing the operation of the pressing means unless the table is in a predetermined position and for preventing the operation of the pressing means at one station unless the ejecting means is in a predetermined position.

4. A two station plastic molding press comprising a hydraulically movable heating platen, a stationary head associated therewith, a hydraulically movable cooling platen, a tiltable head associated therewith, a hydraulically operated toggle connection for tilting the tiltable head, means for varying the length of the toggle connection to adjust the tiltable head for parallelism with the cooling platen, a housing for covering the toggle connection, and means for connecting the toggle housing to the tiltable head to tilt the housing and permit adjustment of the toggle.

5. In a molding press, a reciprocable press head, a tiltable head associated therewith, a hydraulically operated toggle connection for tilting the tiltable head, and an eccentric pin pivotally connecting portions of the toggle for varying the length of the toggle to adjust the tiltable head for parallelism with the reciprocable head.

6. A two station plastic molding press comprising a hydraulically movable platen, a tiltable head associated therewith, a tiltable housing, and means for connecting the housing to the tiltable head to tilt the housing.

7. A two station plastic molding press comprising a hydraulically movable platen, a tiltable head associated therewith, an adjustable toggle connection for tilting the tiltable head, a housing for covering the toggle connection, and means for connecting the toggle housing to the tiltable head to tilt the housing.

8. In a molding press a reciprocable element, a tiltable element associated therewith, a mold member carried by the reciprocable element for containing material to be molded, a second mold member carried by the tiltable element, actuating means for causing the reciprocable element to exert pressure upon the mold members to form the material, and hydraulically operated toggle means independent of the said actuating means including an eccentric member for adjusting the tiltable element at parallelism with the reciprocable element to insure accurate cooperation between the mold members.

9. In a two station plastic holding press, pressing means at each station, a tiltable head at one station, a pivoted housing at the other station, means for tilting the tiltable head and means interconnecting the tiltable head and the pivoted housing to permit pivoting of the housing when the head is tilted.

10. In a molding press, a reciprocable press head, a tiltable head associated therewith, a toggle connection for tilting the same having means cooperating with the tiltable head to limit the range of motion of the toggle, and an eccentric pivot to adjust the length of the toggle.

11. In a molding press, a reciprocable press head, a tiltable head associated therewith, a member pivoted at one end to the head, a second member pivoted at one end to the free end of the first member and carrying at its other end a toothed sector, a rack bar meshing with the toothed sector, hydraulically operated means for moving the rack bar to tilt the head, and an eccentric pin forming a pivot between the two members for adjusting the tiltable head for parallelism with the reciprocable head.

12. In a molding press, a frame, a press head reciprocable therein, a tiltable head pivoted to the frame, a toggle connection for tilting the head comprising a pair of arms having an end of one pivoted to the tiltable head and an end of the other pivoted to the frame and their free ends pivoted together by an eccentric pin, a toothed sector integral with the arm engaging the frame and having its axis coincidental with that of the arm, a rack bar meshing with the toothed sector, hydraulically operated means for moving the rack to actuate the toggle connection, and means for adjusting the eccentric pin for varying the length of the toggle connection to adjust the tiltable head for parallelism with the reciprocable head.

13. In a molding press, a frame, a tiltable head pivoted to the frame, a toggle connection for tilting the head comprising a pair of arms having an end of one pivoted to the tiltable head and an end of the other pivoted to the frame and their free ends pivoted together by an eccentric pin, a toothed sector integral with the arm engaging the frame and having its axis coincidental with that of the arm, a rack bar meshing with the toothed sector, and hydraulically operated means for moving the rack to actuate the toggle connection.

In witness whereof, we hereunto subscribe our names this 28th day of November A. D., 1928.

FRED VOLENTINE JOHNSON.

and this 30th day of November A. D., 1928.

ESTYLE DRUCY HANSON.
DANIEL VAUGHN WATERS.